Patented Nov. 4, 1930

1,780,314

UNITED STATES PATENT OFFICE

ANTON PICAREFF, OF NEW YORK, N. Y., ASSIGNOR TO ANTON PICAREFF ART STUDIOS, INC., OF NEW YORK, N. Y., A CORPORATION OF NEW YORK

COLORING AGENT FOR FABRICS AND METHOD OF MAKING SAME

No Drawing. Original application filed May 14, 1927, Serial No. 191,551. Divided and this application filed May 21, 1929. Serial No. 364,946.

The present invention relates to an improvement in coloring agents for fabrics and method of making the same. One object has been to provide a coloring agent which may be supplied in a wide range of colors and which may be applied to silk and other fabrics more easily and with better decorative effect than has been possible with previously known preparations intended for a similar purpose. In the coloring or decorating of silks and other fabrics with paints, dyes and the like, the effort and skill of the artist or artisan have frequently been offset or materially limited by undesirable characteristics inherent in the medium or coloring agent with which he has worked. For example, it has been difficult to get clear definition of line and demarkation of boundaries between contiguous or adjacent colored areas. Another difficulty is that, where a single color is used as of a dye or paint, the coloring medium has a tendency to spread irregularly or "run" into adjoining uncolored portions of the fabric. Various attempts have been made to overcome this difficulty, as for example, by impregnating certain predetermined portions of the fabric with a wax or other paint or dye resistant substance or "stopper" and removing it by solvents after application of the color to the impregnated portions.

A coloring agent incorporating the features of my invention may be applied freely at ordinary temperatures to a fabric, such as silk, without spreading through the fibers thereof beyond the edge of the surface to which the coloring agent is directly applied. Furthermore, a paint or dye of one color may be applied directly contiguous to that of another color even while the latter remains moist without intermingling of the colors along the line of contiguity. Thus, my improved coloring agent or medium acts both as a paint or dye and as a stopper to be effectively used with paints, dyes and the like of widely varying composition and characteristics.

My improved method of making the above referred to coloring agent and stopper for fabrics includes the step of dissolving a dye stuff thoroughly in boiling water, maintaining the solution at boiling temperature for two or three minutes, then adding a fixing agent. After the solution including the fixing agent has cooled, I add a suitable substance which becomes viscous in solution such as glue, mucilage, Irish moss, gelatin, gum tragacanth, gum acacia, and the like, although for the best results I prefer to use select gum acacia.

The dye stuffs hereinabove referred to may be either basic or acid. If basic, the fixing agent will preferably be tannic acid, and if the dye stuff is acid the fixing agent will preferably be glacial acetic acid, as described and claimed in my Patent No. 1,722,392, July 30, 1929, and of which this application is a division.

Although the ingredients in my improved composition may be brought together in varied proportion within reasonable limits, a preferred mixture and one which has been used successfully is made as follows: ¼ oz. of dye stuff is added to 16½ oz. of boiling water and stirred therein until thoroughly dissolved. This solution is maintained at boiling temperature from two to three minutes and then, if the dye stuff is basic, I add 60 drops of a solution consisting of equal parts by weight of tannic acid and water and the solution is then allowed to cool. Thereafter I add to each ounce thereof ½ oz. of white select acacia gum in powder form and allow it to become thoroughly dissolved. The composition consisting of the hereinabove mentioned ingredients mixed and compounded as and in the proportions specified is then allowed to stand in a covered container for twenty-four hours after which it may be successfully used for the intended purpose.

In this consistency, the composition will be most effectively employed as a so-called stopper, that is, as a medium or agent with which to define the outline or ornamental or other significant forms to be rendered as to their substantial area in a similar or different kind or color of paint, dye or the like applied to the fabric. As so used, the stopper itself has and retains the characteristic color of the dye stuff utilized in its making. It is also possible by a slight variation to use the above described composition of stopper consistency as the basis of a coloring agent adapted particularly for application over more extensive areas than those usually covered in demarking or outlining a pattern or design. For this purpose, to each ounce and one-half of stopper, I add ½ oz. of the composition as it is constituted prior to the addition of the viscous substance or gum acacia. Thereafter, this mixture may be diluted with water to any desired practical extent to be used as a dye or paint for application to fabrics such as silk and the like.

After the coloring agent has been applied either as a stopper defining boundaries of the design, or as a dye or paint covering areas within or outside of said boundaries, or as both, the fabric is subjected to heat for a period of three hours or more, preferably in a chamber containing steam and at a temperature not less than 180 degrees Fahrenheit and then washed in clear water and ironed. Any stiffness of portions of the fabric resulting from the application and drying of the stopper will be removed by the subsequent heating and washing operations without, however, removing or diminishing the effectiveness of the dye color which remains fast in the fabric.

Although I have mentioned the utility of the so-called stopper composition more particularly in connection with use of the coloring agent, paint, or dye derived therefrom as described, said stopper composition may be used also as a stopper where other kinds of coloring agents are used. For example, many known coloring agents or mediums are satisfactory from the viewpoint of color or hue characteristics and permanency. Such mediums may be employed for coloring areas bounded or stopped by suitable applications of my stopping medium, regardless of the character of the solvent or vehicle in which the color medium is in solution or suspension. It is preferable, however, to utilize my improved composition with appropriate variation both as a stopper and as a paint or dye, inasmuch as the ingredients and methods of application can be standardized to produce equally successful results for all colors and all fabrics.

While the composition hereinabove described is referred to as a coloring agent or medium for fabrics, it is contemplated that other and appropriate and valuable uses for it will be found from time to time.

I claim as my invention:

1. A coloring agent for fabrics consisting of a basic dye stuff, gum acacia, and tannic acid in an aqueous solution.

2. A coloring agent for fabrics consisting of water 16½ oz., a basic dye stuff ½ oz., gum acacia 8½ oz. and of tannic acid dissolved in equal weight of water, 60 drops.

3. The method of making a coloring agent for fabrics which includes dissolving a basic dye stuff in boiling water, adding thereto tannic acid, allowing the mixture to cool, and then adding thereto a soluble gum.

In testimony whereof, I have signed my name to this specification this 17th day of May, 1929.

ANTON PICAREFF.